US005150574A

United States Patent [19]

Hirata et al.

[11] Patent Number: 5,150,574

[45] Date of Patent: Sep. 29, 1992

[54] HYDRAULIC DRIVE SYSTEM FOR CIVIL ENGINEERING AND CONSTRUCTION MACHINE

[75] Inventors: Toichi Hirata, Ushiku; Hideaki Tanaka, Tsuchiura; Genroku Sugiyama, Ibaraki; Yusuke Kajita, Tsuchiura, all of Japan

[73] Assignee: Hitachi Construction Machinery Co., Ltd., Tokyo, Japan

[21] Appl. No.: 573,138

[22] PCT Filed: May 1, 1990

[86] PCT No.: PCT/JP90/00573

§ 371 Date: Sep. 24, 1990

§ 102(e) Date: Sep. 24, 1990

[87] PCT Pub. No.: WO90/13748

PCT Pub. Date: Nov. 15, 1990

[30] Foreign Application Priority Data

May 2, 1989 [JP] Japan .............................. 1-112207

[51] Int. Cl.[5] .............................. F16D 31/02

[52] U.S. Cl. .............................. 60/465; 91/446

[58] Field of Search .............. 60/424, 451, 452, 445, 60/459, 465; 91/446, 448, 468; 137/596, 596.13, 906

[56] References Cited

U.S. PATENT DOCUMENTS

| | | | |
|---|---|---|---|
| 3,744,517 | 7/1973 | Budzich | 60/452 |
| 3,865,514 | 2/1975 | Lonnemo | 60/452 |
| 3,937,129 | 2/1976 | Miller | 91/412 |
| 4,089,168 | 5/1978 | Budzich | 91/446 |
| 4,122,677 | 10/1978 | Budzich | 91/446 |
| 4,203,292 | 5/1980 | Deininger | 91/446 |
| 4,362,088 | 12/1982 | Budzich | 137/596 |
| 4,617,854 | 10/1986 | Kropp | 91/517 |
| 4,688,600 | 8/1987 | Kreth et al. | 137/596 |
| 4,762,277 | 8/1988 | Pater et al. | 137/906 |
| 4,864,822 | 9/1989 | Wachs et al. | 60/445 |
| 4,870,819 | 10/1989 | Walzer | 60/445 |
| 4,967,557 | 11/1990 | Izumi et al. | 91/446 |

FOREIGN PATENT DOCUMENTS

| | | |
|---|---|---|
| 3422165 | 12/1984 | Fed. Rep. of Germany . |
| 58-39807 | 3/1983 | Japan . |
| 60-11706 | 1/1985 | Japan . |
| 2144520 | 3/1985 | United Kingdom . |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A hydraulic drive system for a construction machine has a flow control valve (5) disposed between a hydraulic pump and an acutator, a pressure compensating valve for controlling a differential pressure across the flow control valve, and a pump delivery rate regulator for controlling a flow rate of the hydraulic fluid delivered from the hydraulic pump dependent on a differential pressure (Pd−PLS) between a pump pressure and a load pressure of the actuator. The pressure compensating valve has a valve body subjected to control forces. A first control force based on the differential pressure across the flow control valve to the valve body urges the valve body in the valve-closing direction. A second predetermined control force urges the valve body in the valve-operating direction; and a third control force based on the differential pressure (Pd−PLS) between the pump pressure and the load pressure of the actuator urges the valve body in the valve-opening direction.

13 Claims, 7 Drawing Sheets

HYDRAULIC DRIVE SYSTEM FOR CIVIL ENGINEERING AND CONSTRUCTION MACHINE

DESCRIPTION

1. Technical Field

The present invention relates to a hydraulic drive system for civil engineering and construction machines such as hydraulic excavators, and more particularly to a hydraulic drive system for civil engineering and construction machines which includes a pressure compensating valve to control the differential pressure across a flow control valve for controlling operation of an actuator.

2. Background Art

There is known a hydraulic drive system for use in civil engineering and construction machines such as hydraulic excavators, typically called a load sensing system, wherein the delivery flow rate of a hydraulic pump, i.e., the pump delivery rate, is controlled so as to hold the delivery pressure of the hydraulic pump, i.e., the pump pressure, higher by a fixed value than the load pressure of an actuator, causing the hydraulic pump to deliver a hydraulic fluid only at the flow rate necessary for operation of the actuator. As disclosed in JP, A, 60-11706, for example, the load sensing system includes a pump regulator for load sensing control (LS control), which comprises an actuating cylinder for controlling the displacement volume of the hydraulic pump and a control valve actuated responsive to the differential pressure between the pump pressure and the load pressure for controlling operation of the actuating cylinder. The control valve is provided with a spring for urging the control valve in a direction opposite to the differential pressure between the pump pressure and the load pressure. The control valve is operated so as to balance a force of the spring with the differential pressure between the pump pressure and the load pressure. The pump delivery rate is thereby controlled such that the above differential pressure is held at a fixed value corresponding to the spring force, i.e., a target differential pressure.

Furthermore, the load sensing system generally has a pressure compensating valve disposed upstream of a flow control valve to control the differential pressure across the flow control valve, thereby ensuring a flow control function to fluctuations of the differential pressure between the pump pressure and the load pressure.

The pressure compensating valve generally comprises a valve spool disposed in a valve housing in a slidable manner and having a flow control section which serves as a variable restrictor, and first and second control chambers formed in the valve housing in facing relation to each other and accommodating the opposite ends of the valve spool respectively. The inlet pressure of the flow control valve is introduced to the first control chamber working in the valve-closing direction, and the load pressure of the actuator (the outlet pressure of the flow control valve) is introduced to the second control chamber working in the valve-opening direction. A spring for urging the valve spool in the valve-opening direction is disposed in the second control chamber to provide a target value for the pressure compensation. The spring of the pump regulator and the spring of the pressure compensating valve are set into the relationship that the target differential pressure for the LS control is larger than the target value of the compensated differential pressure. Then, the valve spool is operated based on the differential pressure between the inlet pressure of the flow control valve and the load pressure of the actuator respectively introduced to the first and second control chambers, i.e., so as to balance a force of the spring with the differential pressure across the flow control valve, for controlling the differential pressure across the flow control valve.

Stated otherwise, until the differential pressure between the pump pressure controlled by the pump regulator and the load pressure, i.e., the LS differential pressure, reaches the fixed value corresponding to the spring force of the pressure compensating valve, i.e., the target value of the compensated differential pressure, the valve spool is held in a fully open state by that spring force. When the LS differential pressure becomes larger than the target value of the compensated differential pressure and the differential pressure across the flow control valve is about to exceed that target valve, the valve spool starts moving in the valve-closing direction against the spring force to restrict the flow control section for holding the differential pressure across the flow control valve at the target value. The flow rate of hyraulic fluid passing through the flow control valve, i.e., the flow rate of hydraulic fluid supplied to the actuator, is thereby adjusted to a value proportional to the opening area of the flow control valve, thus permitting stable control of the actuator.

One pressure compensating valve of this type is disclosed in U.S. Pat. No. 4,688,600, for example.

However, the hydraulic drive system employing the above conventional pressure compensating valve has accompanied a problem as follows.

In the above conventional pressure compensating valve, when the hydraulic fluid flows through the flow control section of the valve spool, there produces a force acting on the valve spool in the valve-closing direction, i.e., a flow force, due to the flow of the hydraulic fluid. This flow force is a function of the flow rate and flow speed of hydraulic fluid passing through the flow control section. Letting the flow rate be substantially constant, the flow speed is a function of the differential pressure across the flow control section. Thus, the more the flow speed or the differential pressure across the flow control section, the greater the flow force. Therefore, as the LS differential pressure rises, the flow force is increased. This increase in the flow force reduces the setting value of the aforesaid spring, i.e., the target value of the value of the compensated differential pressure. As a result, the characteristic of the differential pressure across the flow control section with respect to the LS differential pressure has a negative gradient. Correspondingly, the charcteristic of the flow rate of hydraulic fluid passing through the flow control valve with respect to the LS differential pressure also has a negative gradient. In short, there is given a characteristic that the LS differential pressure is increased as the flow rate of hydraulic fluid passing through the flow control valve reduces, and it is reduced as that flow rate increases.

Accordingly, under a condition that the LS differential pressure is held at the target differential pressure by control of the pump regulator and the valve spool of the pressure compensating valve is in a restricted state, if the pump delivery rate is reduced for some reason and the flow rate of hydraulic fluid passing through the flow control valve is also reduced correspondingly, the pressure compensating valve operates so as to increase the LS differential pressure. On the other hand, upon such an increase in the LS differential pressure, the pump regulator reduces the pump delivery rate to hold the LS differential pressure at the target differential pressure. Therefore, the flow rate of hydraulic fluid passing through the flow control valve is further reduced, and the pressure compensating valve continues operating to further increase the LS differential pressure. Conversely, if the pump delivery rate is increased and the flow rate of hydraulic fluid passing through the flow control valve is also increased correspondingly, the pressure compensating valve operates so as to reduce the LS differential pressure. In response to such a decrease in the LS differential pressure, the pump regulator increases the pump delivery rate to hold the LS differential pressure at the target differential pressure. With this increase in the flow rate of hydraulic fluid passing through the flow control valve, the pressure compensating valve continues operating to further reduce the LS differential pressure.

As described above, the hydraulic drive system equipped with the conventional pressure compensating valve accompanies a risk that the pump delivery rate is one-sidedly controlled in a direction to only decrease or increase under an influence of the flow force and may finally be brought into an uncontrolled state.

In view of such unintentional characteristic changes in the pressure compensating valve under an influence of the flow force, it is conceivable to provide damping means, e.g., a restrictor, in a passage or line through which the inlet pressure of the pressure compensating valve is introduced, for delaying a response to changes in the pump delivery rate. However, the provision of such a restrictor raises another problem of lowering a response of the pressure compensating valve as its original pressure compensating function.

An object of the present invention is to provide a hydraulic drive system which can prevent control characteristics of the pressure compensating valve from deteriorating due to an influence of the flow force, and can ensure stable control of the pump delivery rate.

DISCLOSURE OF THE INVENTION

To achieve the above object, the present invention provides a hydraulic drive system for a civil engineering and construction machine comprising a hydraulic pump, an actuator driven by a hydraulic fluid delivered from the said hydraulic pump, a flow control valve disposed between the said hydraulic pump and the said actuator, a pressure compensating valve for controlling a differential pressure across the said flow control valve, and pump delivery rate control means for controlling a flow rate of the hydraulic fluid delivered from the said hydraulic pump dependent on a differential pressure between a pump pressure and a load pressure of said actuator, the said pressure compensating valve including a valve body, first control means adapted to apply a first control force based on the differential pressure across the said flow control valve to the said valve body for urging the said valve body in the valve-closing direction, and second control means adapted to apply a second predetermined control force to the said valve body for urging the said valve body in the valve-opening direction, wherein the said pressure compensating valve further includes third control means adapted to apply a third control force based on the differential pressure between the said pump pressure and the load pressure of the said actuator to the said valve body for urging the said valve body in the valve-opening direction.

By applying the third control force based on the differential pressure between the pump pressure and the load pressure of the actuator, i.e., the LS differential pressure, to the valve body for urging the valve body in the valve-opening direction, the characteristic of the differential pressure across the flow control valve with respect to the LS differential pressure is given with a positive gradient such that the former differential pressure is increased as the LS differential pressure increases. Correspondingly, the characteristic of the flow rate of hydraulic fluid passing through the flow control valve with respect to the LS differential pressure is also given with a positive gradient such that the flow rate is increased as the LS differential pressure increases. As a result, the LS differential pressure is controlled to return to its target differential pressure without suffering from an influence of the flow force, even if the pump delivery rate is fluctuated, whereby stable control of the pump regulator can be performed.

Preferably, the said third control means includes first pressure receiving means to which the pump pressure is introduced for urging the valve body in the valve-opening direction. This first pressure receiving means may be formed inside or outside the valve body.

Preferably, the said first control means includes a first control chamber to which the inlet pressure of the flow control valve is introduced, a first pressure receiving region disposed in the first control chamber to urge the valve body in the valve-closing direction, a second control chamber to which the load pressure is introduced, and a second pressure receiving region disposed in the second control chamber to urge the valve body in the valve-opening direction; and the said third control means includes a third pressure receiving region on which the pump pressure acts for urging the valve body in the valve-opening direction, the sum of the pressure receiving area of the second pressure receiving region and the pressure receiving area of the third pressure receiving region being substantially equal to the pressure receiving area of the first pressure receiving region.

Preferably, the said third control means includes a cylinder chamber formed inside the valve body to extend in the axial direction and having one end closed and the other end open to the second pressure receiving region, a piston rod inserted into the cylinder chamber in a slidable manner and projecting outwardly of the valve body from the other end of the cylinder chamber, and a pasasage formed in the valve body for introducing the pump pressure to the cylinder chamber; and the said third pressure receiving region is formed at the closed one end of cylinder chamber. The said value body includes a larger-diameter portion at one end thereof, and the said first pressure receiving region is formed at the end face of the larger-diameter portion; and the said third control means includes an annular end face formed in the larger-diameter portion on the side opposite to the first pressure receiving region, and the said third pressure receiving region is formed at the annular end face.

The said second control means may be a spring or hydraulic means for hydraulically producing the said second control force. In the latter case, the hydraulic means preferably includes first hydraulic pressure producing means adapted to produce a certain hydraulic pressure, second pressure receiving means to which the certain hydraulic pressure is introduced for urging the valve body in the valve-opening direction, second hydraulic pressure producing means adapted to produce a variable hydraulic pressure, and third pressure receiving means to which the variable hydraulic pressure is introduced for urging the valve body in the valve-closing direction.

The present invention also provides a pressure compensating valve for controlling a differential pressure across a flow control valve disposed between a hydraulic pump and an actuator, comprising a valve housing having a spool bore, an inlet recess connected to the said hydraulic pump and an outlet recess connected to the said flow control valve, a valve spool slidably fitted in the said spool bore to control fluid communication between the said inlet recess and the said outlet recess, a first control chamber which is formed in the said valve housing and to which an inlet pressure of the said flow control valve is introduced, a first pressure receiving region disposed in the said first control chamber to urge the said valve spool in the valve-closing direction, a second control chamber which is formed in the said valve spool and to which a load pressure of the said actuator is introduced, and a second pressure receiving region disposed in the said second control chamber to urge the said valve spool in the valve-opening direction, and means for urging the said valve spool with a predetermined control force in the valve-opening direction and setting a target value of the compensated differential pressure, wherein the said pressure compensating means further comprises control means including a third pressure receiving region to which the pressure in the said inlet recess is introduced for urging the said valve spool in the valve-opening direction, the sum of the pressure receiving area of the said second pressure receiving region and the pressure receiving area of the said third pressure receiving region being substantially equal to the pressure receiving area of the said first pressure receiving region.

BEST MODE FOR CARRYING OUT THE INVENTION

Hereinafter, several preferred embodiments of the present invention will be described with reference to the drawings.

FIRST EMBODIMENT

At the outset, a first embodiment of the present invention will be described with reference to FIGS. 1-8.

Figure 1:
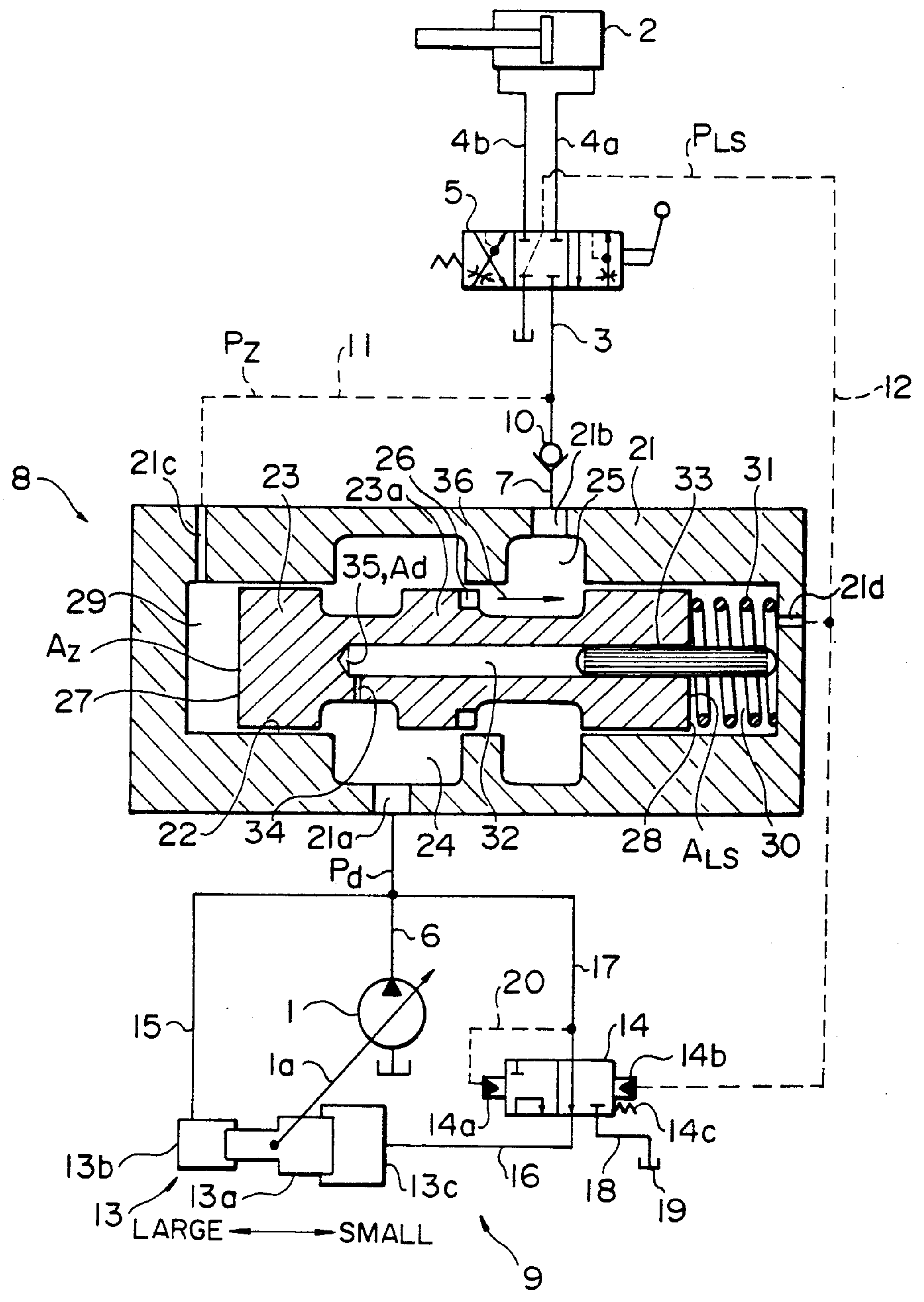
FIG. 1 is a schematic view showing a hydraulic drive system according to a first embodiment of the present invention.

In FIG. 1, a hydraulic drive system of this embodiment comprises a hydraulic pump 1 of variable displacement type, an actuator 2 driven by a hydraulic fluid delivered from the hydraulic pump 1, a flow control valve 5 disposed in lines 3, **4*a*, 4*b* between the hydraulic pump 1 and the actuator 2 for controlling operation of the actuator 2, a pressure compensating valve 8 disposed in lines upstream of the flow control valve 5, i.e., in a discharge line 6 of the hydraulic pump 1 and a line 7, for controlling the differential pressure Pz−PLS across the flow control valve 5, and a pump regulator for controlling the delivery flow rate of the hydraulic pump 1, i.e., the pump delivery rate, dependent on the differential pressure Pd−PS between the pump pressure Pd and the load pressure PLS of the actuator 2. A check valve 10 for preventing a reverse flow of the hydraulic fluid is disposed in the lines 3, 7 between the flow control valve 5 and the pressure compensating valve 8. The inlet pressure Pz of the flow control valve 5 is taken out through a line 11 connected to the line 3, and the outlet pressure of the flow control valve 5, i.e., the load pressure PLS of the actuator 2, is detected through a load line 12 connected to the flow control valve 5**.

The pump regulator 9 includes an actuator 13 coupled to a swash plate **1*a* of the hydraulic pump 1 for controlling the displacement volume of the hydraulic pump 1, and a control valve 14 operated responsive to the differential pressure Pd−PLS between the pump pressure Pd and the load pressure PLS for controlling operation of the actuator 13. The actuator 13 comprises a piston 13*a* with its opposite end faces having the pressure receiving or bearing areas different from each other, and a double-acting cylinder which has a smaller-diameter cylinder chamber 13*b* and a larger-diameter cylinder chamber 13*c* located to respectively accommodate the opposite end faces of the piston 13*a*. The smaller-diameter cylinder chamber 13*b* is communicated with the delivery line 6 of the hydraulic pump 1 via a line 15, while the larger-diameter cylinder chamber 13*c* is selectively connected to the delivery line 6 via a line 16, the control valve 14 and a line 17, or to a reservoir 19 via the line 16, the control valve 14 and a line 18. The control valve 14 is structured such that it has two drive parts 14*a*, 14*b* located in opposite relation, one 14*a* of which is subjected to the pump pressure Ps via a line 20 and the line 17 and the other 14*b* of which is subjected to the load pressure PLS via the load line 12. Further, a spring 14*c* is disposed on the same side as the drive part 14*b* of the control valve 14**.

When the load pressures PLS detected through the load line 12 rises, the control valve 14 is driven leftwardly on the drawing to take an illustrated position, so that the larger-diameter cylinder chamber 13c of the actuator 13 is communicated with the delivery line 6. Due to the difference in pressure receiving area between the opposite end faces of the piston 13a, the piston 13a is forced to move leftwardly on the drawing, thereby to increase the tilting amount of the swash plate 1a, i.e., the displacement volume of the hydraulic pump 1. As a result, the pump delivery rate is increased to raise the pump pressure Pd. Upon a rise in the pump pressure Pd, the control valve 14 is returned rightwardly on the drawing and then stopped when the differential pressure Pd−PLS reaches a target value determined by the spring 14c. At the same time, the pump delivery rate becomes constant. Conversely, when the load pressure PLS lowers, the control valve 14 is driven rightwardly on the drawing so that the larger-diameter cylinder chamber 13c is communicated with the reservoir 19. The piston 13a is thereby forced to move rightwardly on the drawing to reduce the tilting amount of the swash plate 1a. As a result, the pump delivery rate is reduced to lower the pump pressure Pd. Upon a decrease in the pump pressure Pd, the control valve 14 is returned leftwardly on the drawing and then stopped when the differential pressure Pd−PLS reaches the target value determined by the spring 14c. At the same time, the pump delivery rate becomes constant. Thus, the pump delivery rate is controlled such that the differential pressure Pd−PLS is held at the target differential pressure determined by the spring 14c.

The pressure compensating valve 8 comprises a valve housing 21 which has an inlet port 21a, an outlet port 21b and two control ports 21c, 21d and defines a spool bore 22 therein, and a valve spool 23 fitted in the spool bore 22 in such a manner as to be slidable in the axial direction. The valve housing 21 is also formed with annular inlet and outlet recesses 24, 25 respectively communicated with the inlet and outlet ports 21a, 21b, whereas the valve spool 23 is formed in its flow control section 23a with a plurality of notches 26 which collectively constitute a variable resistor between the inlet recess 24 and the output recess 25.

Further, respective pressure receiving regions 27, 28 formed by the opposite end faces of the valve spool 23 are positioned in the valve housing 21 to define two control chambers 29, 30 for urging the valve spool 23 in the valve-closing direction and the valve-opening direction, respectively. These control chambers 29, 30 are communicated with the two control ports 21c, 21d, respectively. A spring 31 is disposed in the control chamber 30.

The inlet port 21a is connected to the delivery line 6, the outlet port 21b is connected to the line 7, the control port 21c is connected to the line 11, and the control port 21d is connected to the load line 12.

Moreover, in this embodiment, the valve spool 23 is axially formed therein with a cylinder chamber 32 which is closed at one end and open to the end face of the pressure receiving region 28 of the valve spool 23. A piston rod 33 is inserted slidably into the cylinder chamber 32 with a portion of the piston rod 33 projecting into the control chamber 30. The valve spool 23 is also formed with a passage 34 for communicating the cylinder chamber 32 with the inlet recess 24. A pressure receiving region 35 is formed at the closed end of the cylinder chamber 32.

Assuming that the pressure receiving area of the pressure receiving region 27 is Az. the pressure receiving area of the pressure receiving region 28 is ALS, and the pressure receiving area of the pressure receiving region 35 is Ad, there holds the relationship of Az=ALS+Ad.

In the above constitution, the control chambers 29, 30 and the pressure receiving regions 27, 28 jointly provide first control means adapted to apply a first control force based on the differential pressure Pz−PLS across the flow control valve 5 to the valve spool 23, thereby urging the valve spool 23 in the valve-closing direction. The spring 31 provides second control means adapted to apply a second control force based on the spring constant thereof to the valve spool 23, thereby urging the valve spool 23 in the valve-opening direction. Furthermore, the control chamber 29 and the associated pressure receiving region 27 as well as the cylinder chamber 32 and the associated pressure receiving region 35 jointly provide third control means adapted to apply a third control force, which is increased with an increase in the differential pressure between the pump pressure subjected to load-sensing control (LS control) by the pump regulator 9 and the load pressure, i.e., the LS differential pressure Pd−PLS, to the valve spool 23, thereby urging the valve spool 23 in the valve-opening direction.

In the first embodiment thus constituted, when the flow control valve 5 is at neutral position, the valve spool 23 is moved leftwardly on the drawing by action of the spring 31 so that the pressure compensating valve 8 is at a fully open state. At this time, the swash plate 1a of the hydraulic pump 1 is held at a minimum tilting position by the pump regulator 9.

Under such a condition, when the flow control valve 5 is appropriately operated in the valve-opening direction from the neutral position, the hydraulic fluid is supplied to the actuator 2, whereupon the pump pressure Pd is about to decrease lower. Accordingly, the pump regulator 9 is operated for increasing the pump delivery rate, as mentioned above. The inlet pressure Pz of the flow control valve 5 and the load pressure PLS of the actuator 2 are introduced to the control chambers 29, 30 of the pressure compensating valve 8 via the lines 11, 12, respectively, and the pump pressure Pd is introduced to the cylinder chamber 32 via the passage 34. The valve spool 23 is thereby subjected to the inlet pressure Pz of the flow control valve 5 introduced to the control chamber 29 in the valve-closing direction, the load pressure PLS introduced to the control chamber 30 in the valve-opening direction, and the pump pressure Pd introduced to the cylinder chamber 32 in the valve-opening direction.

Assuming here that a target value of the LS differential pressure Pd−PLS determined by the spring 14c of the pump regulator 9 is Px, and an initial target value of the compensated differential pressure (described later) of the pressure compensating valve 8 is Po, these values are set to meet the relationship of Px<Po. Therefore, the valve spool 23 will not move until the LS differential pressure Pd−PLs reaches the initial target value Po of the compensated differential pressure, so that the pressure compensating valve 23 remains in a fully open state. When the LS differential pressure exceeds the initial target value Po of the compensated differential pressure, the valve spool 23 is moved in the valve-closing direction dependent on the respective magnitudes of the spring constant of the spring 31, the inlet pressure Pz, the load pressure PLS and the pump pressure Pd to restrict openings of the notches 26, whereby the differential pressure across the flow control valve 5 is held at a predetermined value.

Control characteristics of the pressure compensating valve 8 in this embodiment will be explained in detail. In the above operation of the pressure compensating valve 8, when the hydraulic fluid flows through the notches 26 of the valve spool 23, there produces a force acting on the valve spool 23 in the valve-closing direction, i.e., a flow force 36, due to the flow of the hydraulic fluid. Assuming that the flow force 36 is f and a force of the spring 31 is F, the balance of the forces acting on the valve spool 23 is expressed by:

$$Pz \cdot Az + f = Pd \cdot Ad + F + PLS \cdot ALS \quad (1)$$

Taking into account Az=ALS+Ad, the differential pressure Pz−PLS across the flow control valve 5 is given below from the equation (1):

$$Pz - PLS = (F/Az) - (f/Az) + (Ad/Az)\,(Pd - PLS) \quad (2)$$

Thus, the differential pressure Pz−PLS across the flow control valve 5 to be controlled by the pressure compensating valve 8 is affected by three terms on the right side of the equation (2). For the reason, these three terms will now be studied in detail one by one.

Figure 2:
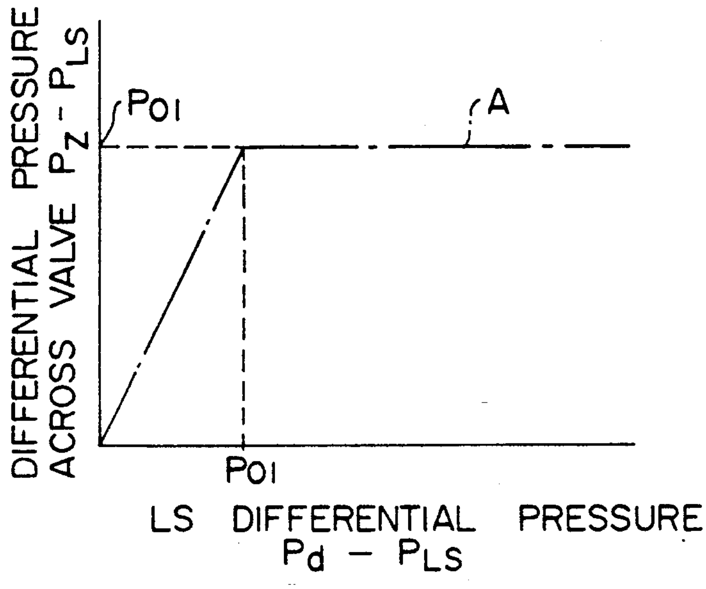
FIG. 2 is a graph showing the characteristic of a spring in a pressure compensating valve.

Firstly, the first term on the right side of the equation (2) represents a term of pressure compensation by the spring 31. This control characteristic exclusively dominated by the spring 31 is given as shown in FIG. 2. In the drawing, a one-dot chain line A indicated the control characteristic in which Po1 is the target value of the compensated differential pressure determined by the spring 31. Specifically, until the LS differential pressure Pd−PLS reaches the target value Po1 of the compensated differential pressure, the valve spool 23 will not move and the pressure compensating valve 23 remains in a fully open state, with the result that the differential pressure Pz−PLS across the flow control valve 5 is changed in a like manner to the LS differential presure Pd−PLS. When the LS differential pressure exceeds the target value Po1 of the compensated differential pressure, the valve spool 23 is moved in the valve-closing direction to restrict openings of the notches 26, with the result that the differential pressure Pz−PLS across the flow control valve 5 is held at the target value Po1.

Secondly, the second term, on the right side of the equation (2) represents a term of influence of the flow force f upon the target value Po1 of the compensated differential pressure caused by the spring 31, which flow force f acts so as to reduce the target value Po1. The flow force f is a function of the flow rate and flow speed of hydraulic fluid passing through the notches 26 and, letting the flow rate be constant, the flow speed is a function of the differential pressure across the notches 26. In the case where the differential pressure Pz−PLS across the flow control valve 5 is changed with respect to an increase in the LS differential pressure Pd−PLS as shown in FIG. 2, therefore, until the LS differential pressure reaches Po1, the flow rate and flow speed of hydraulic fluid are increased with an increase in the LS differential pressure, and hence the flow force f is also increased. After the LS differential pressure exceeds Po1, the differential pressure across the notches 26 is increased with an increase in the Ls differential pressure, and hence the flow force f is also increased dependent on such an increase in the differential pressure across the notches 26. Eventually, the flow force f is continuously increased with an increase in the LS differential pressure, resulting in that the target value of the compensated differential pressure is reduced as indicated by a broken line B in FIG. 3, as the flow force increases. The broken line B has a gradient corresponding to −1/Az.

Thirdly, the third term on the right side of the equation (2) represents a term of influence of the differential pressure between the pump pressure Pd and the load pressure PLS, i.e., the LS differential pressure, caused by providing the cylinder chamber 32. Since Ad/Az is constant, the LS differential pressure acts so as to increase the target value Po1 of the compensated differential pressure. This increase in the target value of the compensated differential pressure due to the LS differential pressure is given as shown by a two-dot chain line C in FIG. 4. The two-dot chain line C has a gradient corresponding to Ad/Az. In the present invention, this gradient is set larger than an absolute value of the gradient of the broken line B in FIG. 3.

Figure 3:
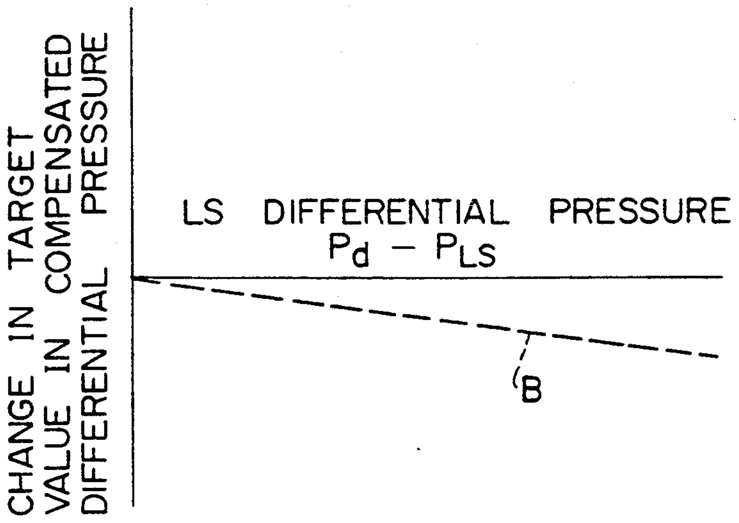
FIG. 3 is a graph showing an influence of the flow force in the pressure compensating valve.
Figure 4:
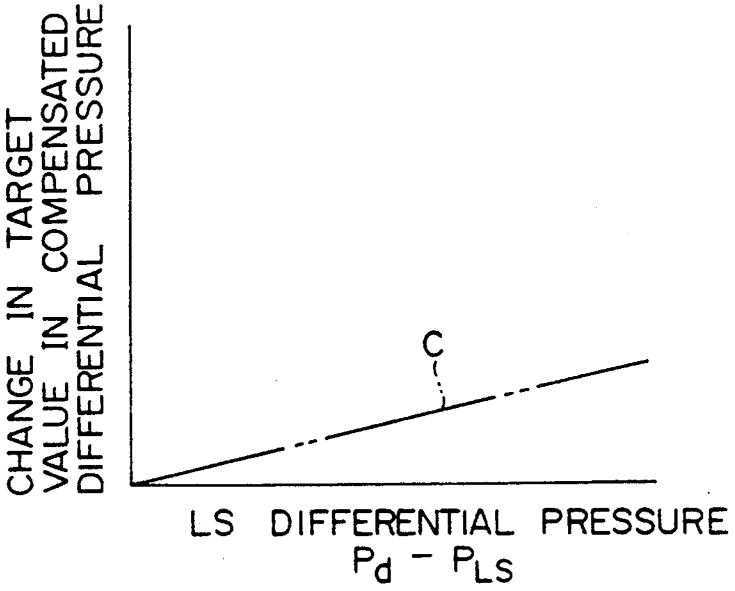
FIG. 4 is a graph showing an influence of the LS differential pressure in the pressure compensating valve.
Figure 5:
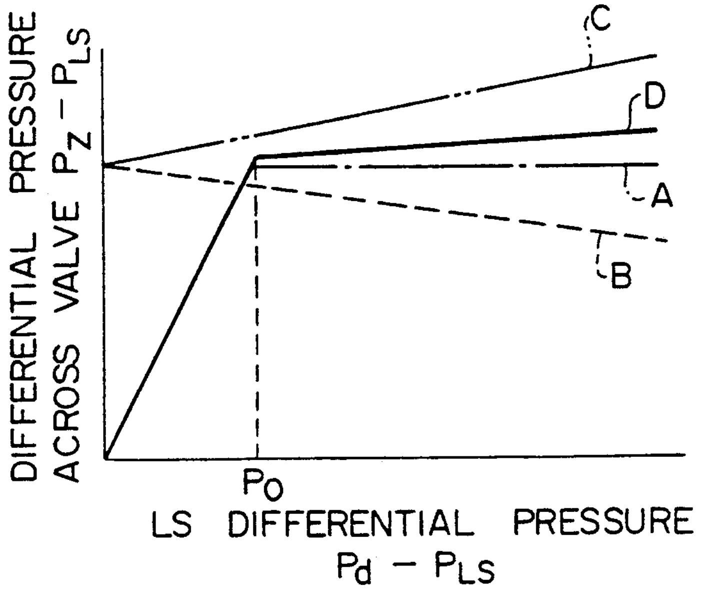
FIG. 5 is a characteristic graph showing the relationship between the LS differential pressure and the differential pressure across a flow control valve, that results from the first embodiment.

The total control characteristic of the equation (2) is obtained by synthesizing the above characteristics of FIGS. 2-4. FIG. 5 shows the synthesized control characteristic by a solid line D.

As will be seen from FIG. 5, in the pressure compensating valve 8 of this embodiment, the characteristic of the differential pressure Pz−PLS across the flow control valve 5 with respect to the LS differential pressure Pd−PLS has a positive gradient such that aftrer the LS differential pressure Pd−PLS exceeds the initial target value Po of the compensated differential pressure, the differential pressure Pz−PLS is increased as the LS differential pressure Pd−PLS increases.

Meanwhile, assuming that the opening area of the flow control valve 5 is A and the proportional constant is K, the flow rate Q of hydraulic fluid passing through the flow control valve 5 is generally expressed by:

$$Q = K \cdot A \cdot \sqrt{Pz - PLS} \quad (3)$$

Figure 6:
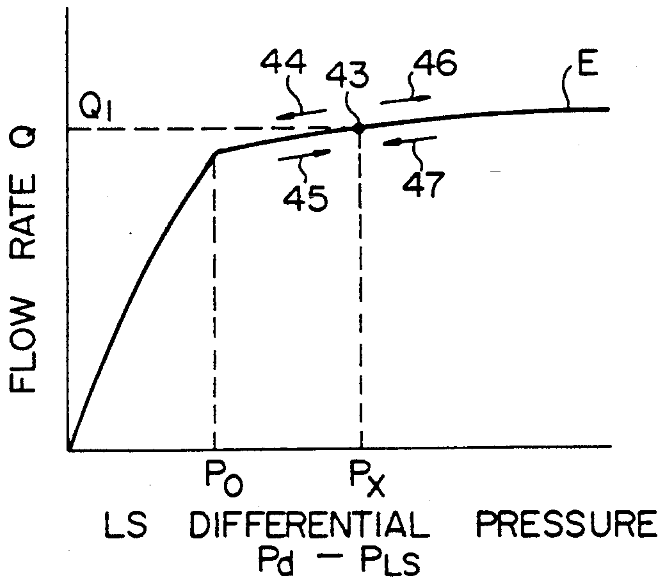
FIG. 6 is a characteristic graph showing the relationship between the LS differential pressure and the flow rate of hydraulic fluid passing through the flow control valve, that results from the first embodiment.

Accordingly, the characteristic of the flow rate Q of hydraulic fluid passing through the flow control valve 5 with respect to the LS differential pressure is given as indicated by a solid line E in FIG. 6 corresponding to the solid line D in FIG. 5. In other words, the characteristic of the flow rate Q through the flow control valve 5 with respect to the LS differential pressure Pd−PLS also has a positive gradient such that after the LS differential pressure Pd−PLS exceeds the initial target value Po of the compensated differential pressure, the flow rate Q is increased as the LS differential pressure Pd−PLS increases.

Figure 7:
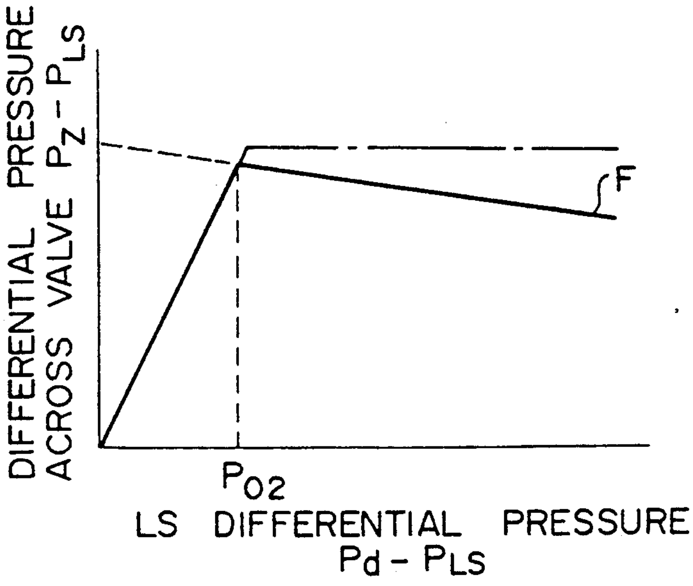
FIG. 7 is a characteristic graph showing the relationship between the LS differential pressure and the differential pressure across the flow control valve, that results from a conventional pressure compensating valve.
Figure 8:
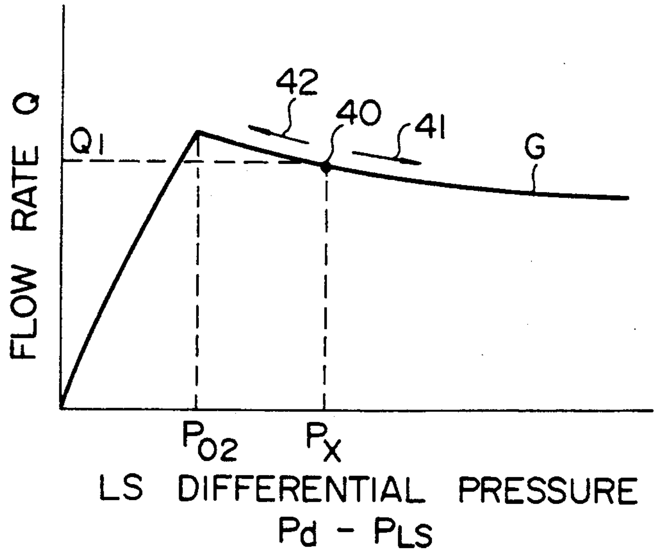
FIG. 8 is a characteristic graph showing the relationship between the LS differential pressure and the flow rate of hydraulic fluid passing through the flow control valve, that results from the conventional pressure compensating valve.

For comparison, the characteristic of the differential pressure Pz−PLS across the flow control valve 5 with respect to the LS differential pressure Pd−PLS across a conventional pressure compensating valve, which has neither the cylinder chamber 32 nor the piston rod 33 as features of this embodiment, is indicated by a solid line F in FIG. 7. Then, the corresponding characteristic of the flow rate Q through a flow control valve with respect to the LS differential pressure is indicated by a solid line G in FIG. 8. In the conventional pressure compensating valve, as will be seen from FIG. 7, the former characteristic has a negative gradient such that after the LS differential pressure exceeds an initial target value Po2 of the compensated differential pressure, the differential pressure Pz−PLS is reduced under an influence of the flow force as the LS differential pressure Pd−PLS increases. Likewise, as shown in FIG. 8, the latter characteristic has a negative gradient such that after the LS differential pressure exceeds the initial target value Po2 of the compensated differential pressure, the flow rate Q is reduced as the LS differential pressure Pd−PLS increases.

An advantageous effect based on the foregoing control characteristics of the pressure compensating valve of this embodiment will be described below.

First, operation of a hydraulic drive system using the conventional pressure compensating valve, which has the control characteristics shown in FIGS. 7 and 8, will be explained.

When the LS differential pressure is held at the target value Px by the pump regulator 9, the valve spool of the pressure compensating valve is moved in the valve-closing direction into a restricting state. The position on the characteristic line G of FIG. 8 at this time is denoted by 40, and the corresponding flow rate is denoted by Q1. Under such a condition, if the pump delivery rate is reduced for some reason and the flow rate of hydraulic fluid passing through the flow control valve 5 is also reduced correspondingly, the position 40 on the characteristic line G is moved in a direction indicated by arrow 41 and the pressure compensating valve operates so as to increase the LS differential pressure, because the realationship between the LS differential pressure Pd−PLS and the flow rate Q is dominated by the characteristic having a negative gradient. On the other hand, upon such as increase in the LS differential pressure, the pump regulator 9 operates to reduce the pump delivery rate dependent on the increase in the LS differential pressure for holding the LS differential pressure at the target value Px. As the pump delivery rate reduces, the flow rate Q of hydraulic fluid passing through the flow control valve 5 is further reduced, whereby the position on the characteristic line G is still moved in the direction of arrow 41 and the pressure compensating valve continues operating to further increase the LS differential pressure. As a result of repeating the above process, the pump delivery rate is one-sidedly controlled in a direction to only decrease, and the pump regulator 9 is finally brought into an uncontrolled state, making it impossible to drive the actuator at a desired speed.

Conversely, if the pump delivery rate is increased and the flow rate Q of hydraulic fluid passing through the flow control valve 5 is also increased correspondingly, the position 40 on the characteristic line G is moved in a direction indicated by arrow 42 and the pressure compensating valve operates so as to reduce the LS differential pressure. In reponse to such a decrease in the LS differential pressure, the pump regulator 9 operates to increase the pump delivery rate. With a resulting increase in the flow rate Q through the flow control valve, the pressure compensating valve continues operating to further reduce the LS differential pressure. As a result of repeating the above process, the pump delivery rate is one-sidedly controlled in a direction to only increase, and the pump regulator 9 is finally brought into an uncontrolled state, making it impossible to drive the actuator properly, as with the above case.

In contrast, the hydraulic drive system of this embodiment operates as follows. Let it be supposed that when the LS differential pressure is held at the target value Px by the pump regulator 9, it takes a position 43 on the characteristic line E shown in FIG. 6. Under such a condition, if the pump delivery rate is reduced for some reason and the flow rate of hydraulic fluid passing through the flow control valve 5 is also reduced correspondingly, the position 43 on the characteristic line E is moved in a direction indicated by arrow 44 and the pressure compensating valve 8 operates so as to reduce the LS differential pressure, because the relationship between the LS differential pressure Pd−PLS and the flow rate Q is dominated by the characteristic having a positive gradient. On the other hand, upon such a decrease in the LS differential pressure, the pump regulator 9 operates to increase the pump delivery rate dependent on the decrease in the LS differential pressure for holding the LS differential pressure at the target value Px. As the pump delivery rate increases, the flow rate Q of hydraulic fluid passing through the flow control valve 5 is also increased, whereby the position on the characteristic line E is moved toward the original position 43 as indicated by arrow 45 and the pressure compensating valve 8 operates now to return the LS differential pressure Pd−PLS to the target value Px. As a result, the LS differential pressure is held again at the target value Px.

Conversely, if the pump delivery rate is increased and the flow rate Q of hydraulic fluid passing through the flow control valve 5 is also increased correspondingly, the position 43 on the characteristic line E is moved in a direction indicated by arrow 46 and the pressure compensating valve 8 operates so as to increase the LS differential pressure. In response to such an increase in the LS differential pressure, the pump regulator 9 operates to reduce the pump delivery rate. With a resulting decrease in the flow rate Q through the flow control valve, the position on the characteristic line E is moved in a direction indicated by arrow 47, and the pressure compensating valve operates now to reduce the LS differential pressure. As a result, the LS differential pressure is held again at the target value Px, as with the above case.

With this embodiment, as described above, the LS differential pressure Pd−PLS is controlled to return to the target value Px without suffering from any adverse influence of the flow force, thereby permitting stable control of the pump regulator 9. This makes it possible to supply the hydraulic fluid to the actuator 2 via the flow control valve 5 at the flow rate Q dependent on the opening of the flow control valve 5, and hence to control a drive speed of the actuator 2 in a stable manner without suffering from an influence of fluctuations in the pump delivery rate.

Further, because of no need of providing dampling means such as a restrictor, good response of the pressure compensating valve 8 can be ensured. In addition, manufacture of the pressure compensating valve is easy to its simple structure wherein the cylinder chamber 32 and the passage 34 are formed in the valve spool 23, and the piston rod 33 is inserted into the cylinder chamber 32.

Second Embodiment

A second embodiment of the present invention will be described with reference to FIG. 9. In this embodiment, the means for determining a target value of the compensated differential pressure is constituted by hydraulic means in place of the spring.

Figure 9:
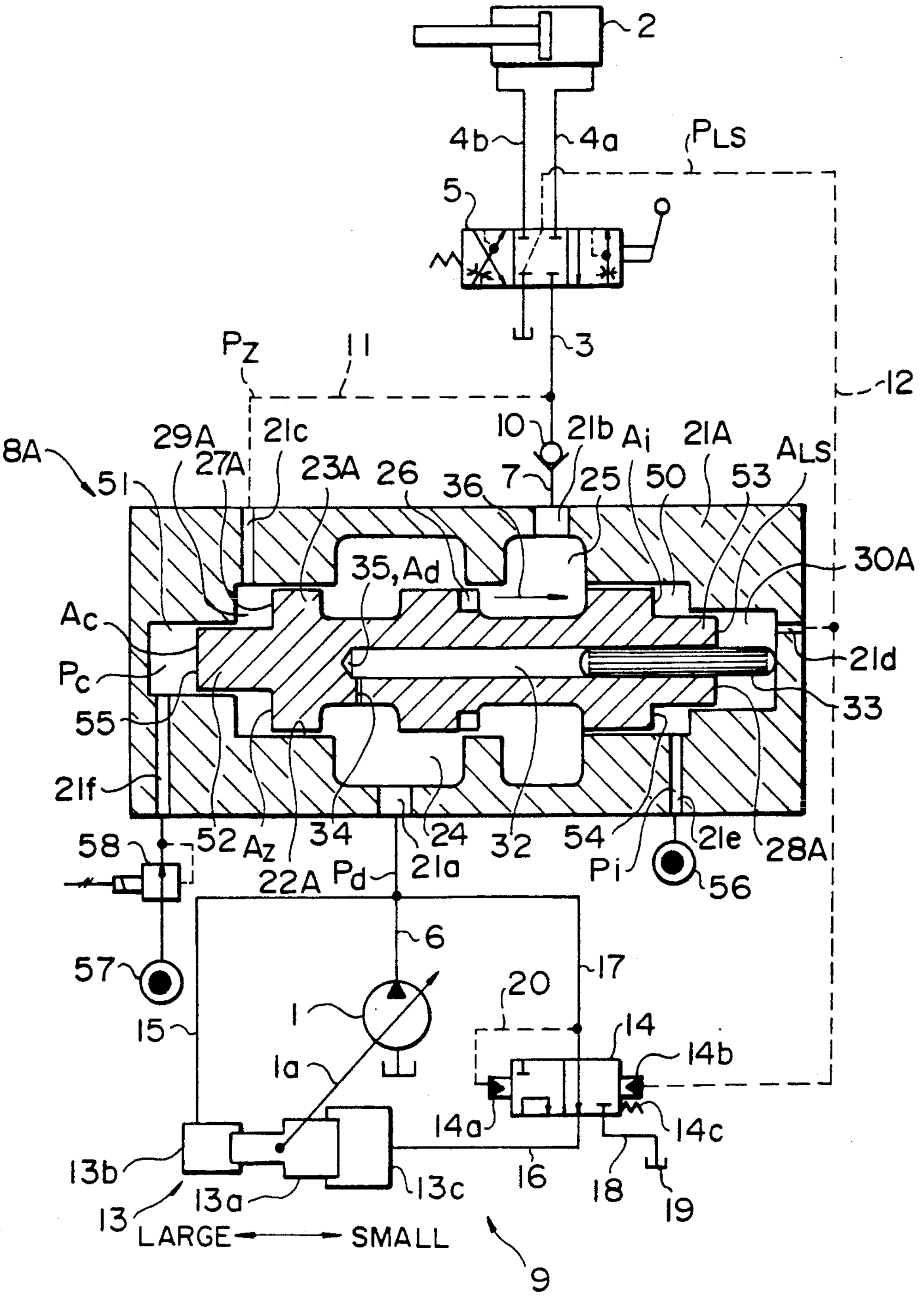
FIG. 9 is a schematic view showing a hydraulic drive system according to a second embodiment of the present invention.

In FIG. 9, a pressure compensating valve 8A of this embodiment comprises a valve housing 21A which has two control ports 21*e*, 21*f*, in addition to an inlet port 21a, an outlet port 21b and two control ports 21c, 21d. In the valve housing 21A, there are defined a spool bore 22A, annular inlet and outlet recesses 24, 25, and four control chambers 29A, 30A, 50, 51. A valve spool 23A formed with a plurality of notches 26 is fitted in the spool bore 21A in such a manner as to slide in the axial direction.

A pair of smaller-diameter portions 52, 53 are formed at the opposite ends of the valve spool 23A, thereby to define annular pressure receiving regions 27A, 54 radially projecting from the smaller-diameter portions 52, 53 and pressure receiving regions 55, 28A at the end faces of the smaller-diameter portions 52, 53, respectively. The pressure receiving regions 27A, 28A are positioned in the two control chambers 29A, 30A which are subjected to the inlet pressure Pz of the flow control valve 5 and the load pressure PLS of the actuator 2 via the control ports 21c, 21d, respectively. The pressure receiving regions 54, 55 are positioned in the control chambers 50, 51, respectively, the former 50 of which is communicated with a hydraulic source 56 via the control ports 21e and the latter 51 of which is communicated via the control port 21f with a solenoid proportional valve 58 in turn connected to another hydraulic source 57.

The hydraulic sources 56, 57 each produce a constant pilot pressure Pi. The solenoid proportional valve 58 reduces the constant pilot pressure from the hydraulic source 57 dependent on an electric signal applied thereto. The control force produced in the control chamber 50 with the pilot pressure Pi from the hydraulic source 56 urges the valve spool 23A in the valve-opening direction, while the control force produced in the control chamber 51 with the control pressure Pc from the solenoid proportional valve 58 urges the valve spool 23A in the valve-closing direction. The pressure receiving regions 54, 55 have their pressure receiving areas equal to each other as described later, and the pilot pressure Pi and the control pressure Pc are set such that the control force resulted from the former is greater than the control force resulted from the latter. The resulting difference between both the control forces urges the valve spool 23A in the valve-opening direction for providing the target value of the compensated differential pressure as with the spring in the first embodiment. By controlling the solenoid proportional valve 58 to adjust the control pressure Pc, it is also possible to control the difference between both the control forces for freely changing the target value of the compensated differential pressure.

In addition, the invention of EP, A1, 326,150 (corresponding to JP, A, 1-312202), for example, can be applied to control of the above solenoid proportional valve. With this application, when a hydraulic pump is saturated in a hydraulic drive system for driving a plurality of actuators, respective target values of the compensated differential pressure across a plurality of pressure compensating valves can properly be modified to carry out adequate flow control such as distribution control for supplying a hydraulic fluid to respective actuators with certainty.

As with the first embodiment, the valve spool 23A has therein a cylinder chamber 32, a passage 34 and a pressure receiving region 35, with a piston rod 33 inserted slidably into the cylinder chamber 32.

Assuming that the pressure receiving area of the pressure receiving region 27A is Az, the pressure receiving area of the pressure receiving region 28A is ALS, the pressure receiving area of the pressure receiving region 35 is Ad, the pressure receiving area of the pressure receiving region 54 is Ai, and the pressure receiving area of the pressure receiving region 55 is Ac, there hold the relationships of $Az+Ac=ALS+Ad+Ai$ and $Az=ALS+Ad$ (therefore $Ac=Ai$).

In the above constitution, the control chambers 29A, 30A and the pressure receiving regions 27A, 28A jointly provide first control means adapted to apply a first control force based on the differential pressure Pz−PLS across the flow control valve 5 to the valve spool 23A, thereby urging the valve spool 23A in the valve-closing direction. The control chambers 50, 51 and the pressure receiving regions 54, 55 jointly provide second control means adapted to apply a second control force based on the pilot pressure Pi and the control pressure Pc to the valve spool 23A, thereby urging the valve spool 23A in the valve-opening direction. Furthermore, the control chamber 29A and the associated pressure receiving region 27A as well as the cylinder chamber 32 and the associated pressure receiving region 35 jointly provide third control means adapted to apply a third control force, which is increased with an increase in the differential pressure between the pump pressure subjected to LS control by the pump regulator 9 and the load pressure, i.e., the LS differential pressure Pd−PLS, to the valve spool 23A, thereby urging the valve spool 23A in the valve-opening direction.

In this embodiment thus constituted, the balance of the forces acting on the valve spool 23A is expressed below in consideration of the flow force f as well:

$$Pc\cdot Ac+Pz\cdot Az+f=Pd\cdot Ad+Pi\cdot Ai+PLS\cdot ALS \qquad (4)$$

Taking into account $Az+Ac=Ad+ALS+Ai$ and $Ac=Ai$, the differential pressure Pz−PLS across the flow control valve 5 is given below from the equation (4):

$$Pz-PLS=\{Ai(Pi-Pc)/Az\}-(f/Az)+(Ad/Az)(Pd-PLS) \qquad (5)$$

In the equation (5), the first term on the right side is a value determined dependent on the control pressure Pi and corresponds to the first term on the right side of the equation (2). The second and third terms on the right side are identical to those in the equation (2), respectively.

Accordingly, in this embodiment, the characteristic of the differential pressure Pz−PLS across the flow control valve 5, under control of the pressure compensating valve 8A, with respect to LS differential pressure Pd−PLS is also given as indicated by the solid line D in FIG. 5. Likewise, the characteristic of the flow rate Q of hydraulic fluid passing through the flow control valve 5 with respect to the LS differential pressure is given as indicated by the solid line E in FIG. 6. In other words, the characteristic of the differential pressure Pz−PLS across the flow control valve 5 with respect to the LS differential pressure Pd−PLS has a positive gradient such that after the LS differential pressure Pd−PLS exceeds the initial target value Po of the compensated differential pressure, the differential pressure Pz−PLS is increased as the LS differential pressure Pd−PLS increases. The characteristic of the flow rate Q of hydraulic fluid passing through the flow control valve 5 with respect to the LS differential pressure Pd−PLS also has a positive gradient such that after the LS differential pressure Pd−PLS exceeds the initial target value Po of the compensated differential pressure, the flow rate Q is increased as the LS differential pressure Pd−PLS increases.

Consequently, this embodiment can also provide the similar advantageous effect to that of the first embodiment. With this embodiment, it is further possible to appropriately change the target value Po1 of the compensated differential pressure, shown in FIG. 2, by varying the control pressure Pc, and hence to carry out desired flow control such as distribution control at the time of pump saturation as mentioned above.

Third Embodiment

A third embodiment of the present invention will be described with reference to FIG. 10. In this embodiment, the means for applying a control force, which is to be increased with an increase in the LS differential pressure, is provided not in the interior of the valve spool like the pressure receiving region inside the cylinder chamber, but in the exterior thereof.

Figure 10:
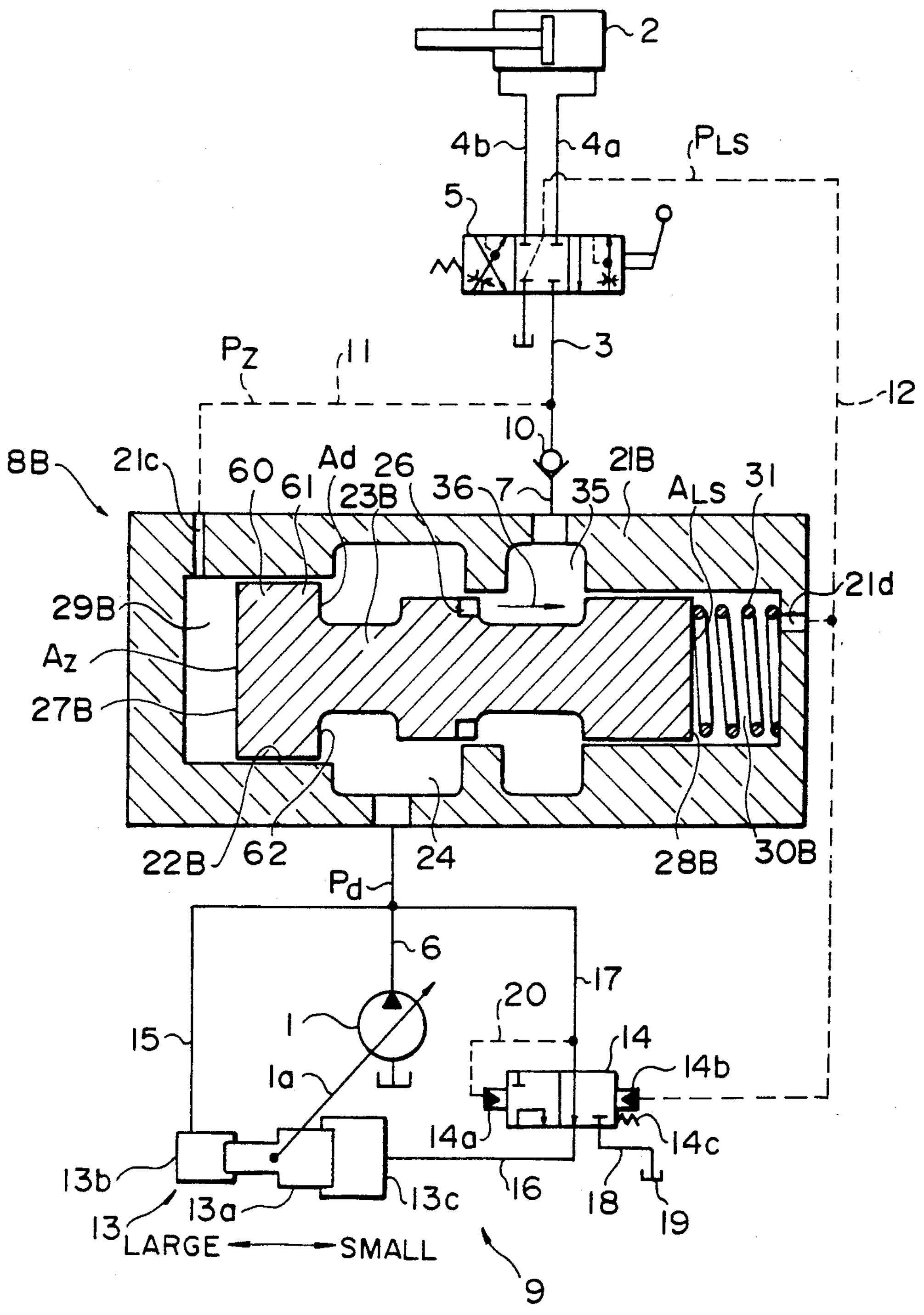
FIG. 10 is a schematic view showing a hydraulic drive system according to a third embodiment of the present invention.

In FIG. 10, a pressure compensating valve 8B of this embodiment comprises a valve housing 21B which has an inlet port **21*a*, an outlet port 21*b* and two control ports 21*c*, 21*d*, with a spool bore 22B, annular inlet and outlet recesses 24, 25 and two control chambers 29B, 30B defined in the valve housing 21B, similarly to the first embodiment. A valve spool 23B having a plurality of notches 26 is fitted in the spool bore 21B** in such a manner that it is able to slide in the axial direction.

One end of the valve spool 23B is formed into a larger-diameter portion 60, one end face of which serves as a pressure receiving region 27B and the other end face of which serves as a pressure receiving region 28B. The pressure receiving regions 27B, 28B are positioned in the two control chambers 29B, 30B, respectively. To allow this, the control chamber 29B is formed to have a larger diameter than that of the control chamber 29A. The control chambers 29B, 30B are subjected to the inlet pressure Pz of the flow control valve 5 and the load pressure PLS of the actuator 2 via the control ports **21*c*, 21*d*, respectively. Furthermore, a spring 31 is disposed in the control chamber 30B**.

At a shoulder 61 of the larger-diameter portion 60 on the side opposite to the pressure receiving region 27B thereof, an annular end face is formed in facing relation to the inlet recess 24. This end face serves as a pressure receiving region 62 subjected to the pump pressure in the inlet recess 24 for urging the valve spool 23B in the valve-opening direction.

Assuming that the pressure receiving area of the pressure receiving region 27B is Az, the pressure receiving area of the pressure receiving region 28B is ALS, and the pressure receiving area of the pressure receiving region 62 is Ad, there holds the relationship of Az =ALS +Ad.

In the above constitution, the control chambers 29B, 30B, the associated pressure receiving regions 27B, 28B and the spring 31 have the same functions as those in the first embodiment. Furthermore, the control chamber 29B, the pressure receiving region 27B and the pressure receiving region 62 jointly provide third control means adapted to apply a third control force, which is increased with an increase in the differential pressure between the pump pressure subjected to LS control by the pump regulator 9 and the load pressure, i.e., the LS differential pressure Pd−PLS, to the valve spool 23B, thereby urging the valve spool 23B in the valve-opening direction.

In this embodiment thus constituted, the balance of the forces acting on the valve spool 23B is expressed below in consideration of the flow force f as well, similarly to the equation (1):

$$Pz \cdot Az + f = Pd \cdot Ad + F + PLS \cdot ALS$$

Taking into account Az =ALS+Ad, the differential pressure Pz−PLS across the flow control valve 5 is given below from the above equation:

$$Pz - PLS = (F/Az) - (f/Az) + (Ad/Az)\,(Pd - PLS)$$

Accordingly, in this embodiment, the characteristic of the differential pressure Pz −PLS across the flow control valve 5, under control of the pressure compensating valve 8B, with respect to the LS differential pressure Pd−PLS is also given with a positive gradient as indicated by the solid line D in FIG. 5. Likewise, the characteristic of the flow rate Q of hydraulic fluid passing through the flow control valve 5 with respect to the LS differential pressure is given with a positive gradient as indicated by the solid line E in FIG. 6. As a consequence, this embodiment can also provide the similar advantageous effect to that of the first embodiment.

INDUSTRIAL APPLICABILITY

According to the present invention, the characteristic of the flow rate passing through the flow control valve 5 with respect to the differential pressure between the pump pressure and the load pressure (i.e., the LS differential pressure) is set to a characteristic with a positive gradient, namely, to a characteristic that the LS differential pressure is increased and decreased as the flow rate increases and decreases, resulting in that the presence of the flow force will not bring the pump delivery rate into an uncontrolled state, and stable flow control can be performed. In addition, it is also possible to ensure good response and to manufacture the valve with a relatively simple construction.

What is claimed is:

1. A hydraulic drive system for a civil engineering and construction machine comprising a hydraulic pump, an actuator driven by a hydraulic fluid delivered from said hydraulic pump, a flow control valve disposed between said hydraulic pump and said actuator, a pressure compensating valve for controlling a differential pressure across said flow control valve, and pump delivery rate control means for controlling a flow rate of said hydraulic fluid delivered from said hydraulic pump dependent on a differential pressure between a pump pressure and a load pressure of said actuator, said pressure compensating valve including a valve body, first control means adapted to apply a first control force based on the differential pressure across said flow control valve to said valve body for urging said valve body in the valve-closing direction, and second control means adapted to apply a second predetermined control force to said valve body for urging said valve body in the valve-opening direction, wherein:

said pressure compensating further includes third control means adapted to apply third control force based on the differential pressure between said pump pressure and the load pressure of said actuator to said valve body for urging said valve body in the valve-opening direction for counteracting a flow force generated by a flow of hydraulic fluid through said pressure compensating valve.

2. A hydraulic drive system for a civil engineering and construction machine according to claim 1, wherein said third control means includes first pressure receiving means to which said pump pressure is introduced for urging said valve body in the valve-opening direction.

3. A hydraulic drive system for a civil engineering and construction machine according to claim 2, wherein said first pressure receiving means is formed inside said valve body.

4. A hydraulic drive system for a civil engineering and construction machine according to claim 2, wherein said first pressure receiving means is formed outside said valve body.

5. A hydraulic drive system for a civil engineering and construction machine according to claim 1, wherein said first control means includes a first control chamber to which the inlet pressure of said flow control valve is introduced, a first pressure receiving region disposed in said first control chamber to urge said valve body in the valve-closing direction, a second control chamber to which said load pressure (PLS) is introduced, and a second pressure receiving region disposed in said second control chamber to urge said valve body in the valve-opening direction, and wherein said third control means includes a third pressure receiving region on which said pump pressure acts for urging said valve body in the valve-opening direction, the sum of the pressure receiving area of said second pressure receiving region and the pressure receiving area of said third pressure receiving region being substantially equal to the pressure receiving area of said first pressure receiving region.

6. A hydraulic drive system for a civil engineering and construction machine according to claim 5, wherein said third control means includes a cylinder chamber formed inside said valve body to extend in the axial direction and having one end closed and the other end open to said second pressure receiving region, a piston rod inserted into said cylinder chamber in a slidable manner and projecting outwardly of said valve body from the other end of said cylinder chamber, and a passage formed in said valve body for introducing said pump pressure to said cylinder chamber, and wherein said third pressure receiving region is formed at the closed one end of said cylinder chamber.

7. A hydraulic drive system for a civil engineering and construction machine according to claim 5, wherein said valve body includes a larger-diameter portion at one end thereof, and said first pressure receiving region is formed at the end face of said larger-diameter portion, and wherein said third control means includes an annular end face formed in said larger-diameter portion on the side opposite to said first pressure receiving region, and said third pressure receiving region is formed at said annular end face.

8. A hydraulic drive system for a civil engineering and construction machine according to claim 1, wherein said second control means is a spring.

9. A hydraulic drive system for a civil engineering and construction machine according to claim 1, wherein said second control means is hydraulic means for hydraulically producing said second control force.

10. A hydraulic drive system for a civil engineering and construction machine according to claim 9, wherein said hydraulic means includes first hydraulic pressure producing means adapted to produce a certain hydraulic pressure, second pressure receiving means to which said certain hydraulic pressure is introduced for urging said valve body in the valve-opening direction, second hydraulic pressure producing means adapted to produce a variable hydraulic pressure, and third pressure receiving means to which said variable hydraulic pressure is introduced for urging said valve body in the valve-closing direction.

11. A pressure compensating valve for controlling a differential pressure across a flow control valve disposed between a hydraulic pump and an actuator, comprising a valve housing having a spool bore, an inlet recess connected to said hydraulic pump and an outlet recess connected to said flow control valve, a valve spool slidably fitted in said spool bore to control fluid communication between said inlet recess and said outlet recess, a first control chamber which is formed in said valve housing and to which an inlet pressure of said flow control valve is introduced, a first pressure receiving region disposed in said first control chamber to urge said valve spool in the valve-closing direction, a second control chamber which is formed in said valve spool and to which a load pressure of said actuator is introduced, and a second pressure receiving region disposed in said second control chamber to urge said valve spool in the valve-opening direction, and means for urging said valve spool with a predetermined control force in the valve-opening direction and setting a target value of the compensated differential pressure wherein:

said pressure compensating means further comprises control means including a third pressure receiving region to which the pressure in said inlet recess is introduced for urging said valve spool in the valve-opening direction, the sum of the pressure receiving area of said second pressure receiving region and the pressure receiving area of said third pressure receiving region being substantially equal to the pressure receiving area of said first pressure receiving region.

12. A pressure compensating valve according to claim 11, wherein said control means includes a cylinder chamber formed inside said valve spool to extend in the axial direction and having one end closed and the other end open to said second pressure receiving region, a piston rod inserted into said cylinder chamber in a slidable manner and projecting outwardly of said valve spool from the other end of said cylinder chamber, and a passage formed in said valve spool for introducing a pressure in said inlet recess to said cylinder chamber, and wherein said third pressure receiving region is formed at the closed one end of said cylinder chamber.

13. A pressure compensating valve according to claim 11, wherein said valve spool includes a larger-diameter portion at one end thereof, and said first pressure receiving region is formed at the end face of said larger-diameter portion, and wherein said control means includes an annular end face formed in said larger-diameter portion on the side opposite to said first pressure receiving region and located in facing relation to said inlet recess, and said third pressure receiving region is formed at said annular end face.

* * * * *